US006966114B2

(12) United States Patent  (10) Patent No.: US 6,966,114 B2
Daniel et al.  (45) Date of Patent: Nov. 22, 2005

(54) WIRE NIPPER

(75) Inventors: Barton Wade Daniel, Kennesaw, GA (US); Glenn F. Ellison, Lubbock, TX (US); Scott G. Shepard, Lubbock, TX (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 10/903,793

(22) Filed: Jul. 30, 2004

(65) Prior Publication Data

US 2005/0050736 A1  Mar. 10, 2005

Related U.S. Application Data

(63) Continuation-in-part of application No. 10/351,840, filed on Jan. 27, 2003.

(51) Int. Cl.⁷ .............................................. B26B 13/00

(52) U.S. Cl. ............................. 30/188; 30/249; 30/258

(58) Field of Search ......................... 30/249, 188, 258, 30/260, 261, 253, 246, 155, 175, 251, 252, 30/193, 134, 135, 92

(56) References Cited

U.S. PATENT DOCUMENTS

| 58,326 | A |   | 9/1866  | Waters          |        |
|--------|---|---|---------|-----------------|--------|
| 476,279| A |   | 6/1892  | Levin           |        |
| 513,366| A | * | 1/1894  | O'Connell       | 30/249 |
| 1,622,446 | A |  | 3/1927 | Jourdan         |        |
| 1,791,608 | A |  | 2/1931 | Wippel          |        |
| 1,822,591 | A | * | 9/1931 | Hickok          | 30/271 |
| 2,650,423 | A | * | 9/1953 | Phillips        | 30/261 |
| 2,975,518 | A | * | 3/1961 | Nelson          | 30/263 |
| 3,339,280 | A |  | 9/1967 | Hall            | 30/251 |
| 3,372,478 | A | * | 3/1968 | Wallace et al.  | 30/252 |
| 3,587,172 | A |  | 6/1971 | Link et al.     | 30/246 |
| 4,314,400 | A | * | 2/1982 | Davis           | 30/249 |
| 4,785,538 | A | * | 11/1988| Meyer           | 30/258 |
| 5,241,752 | A |  | 9/1993 | Lutzke et al.   | 30/249 |
| 5,809,654 | A |  | 9/1998 | Huang           | 30/135 |
| 6,000,307 | A | * | 12/1999| Aamodt          | 30/251 |
| 6,185,825 | B1 |  | 2/2001 | Olson          | 30/250 |
| 6,681,492 | B1 |  | 1/2004 | Huang          | 30/250 |
| 2002/0020067 | A1 |  | 2/2002 | Silver et al.  | 30/226 |

* cited by examiner

*Primary Examiner*—Stephen Choi
(74) *Attorney, Agent, or Firm*—Grant D. Kang; Dennis J. M. Donahue, III; Husch & Eppenberger LLC

(57) ABSTRACT

A wire cutter having a handle, a fixed cutting blade mounted on the handle, a lever pivotally connected to the handle, and a stop on the lever for engagement with the fixed cutting blade is disclosed. The wire cutter also includes a spring to bias the lever to an "open" position.

23 Claims, 4 Drawing Sheets

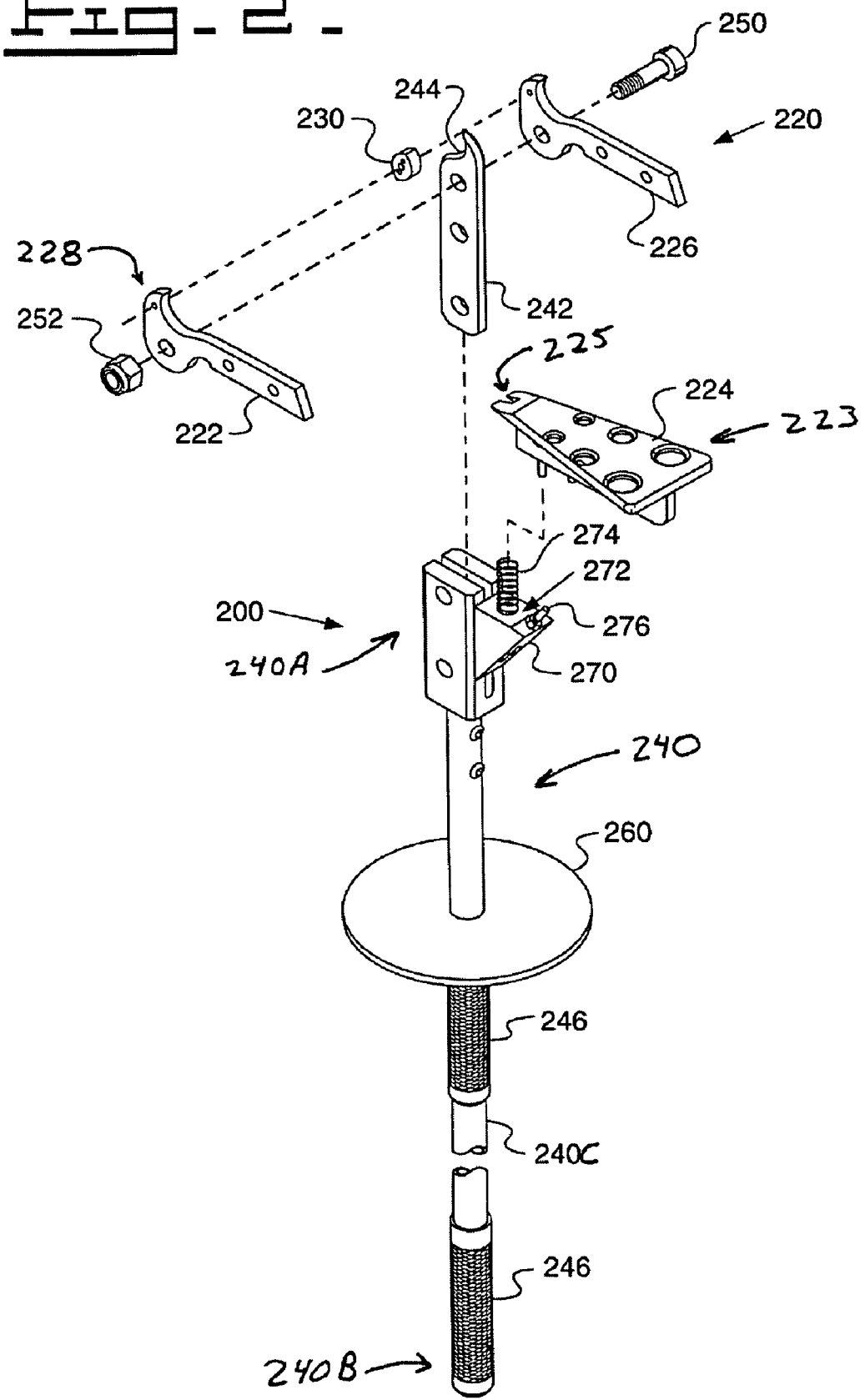

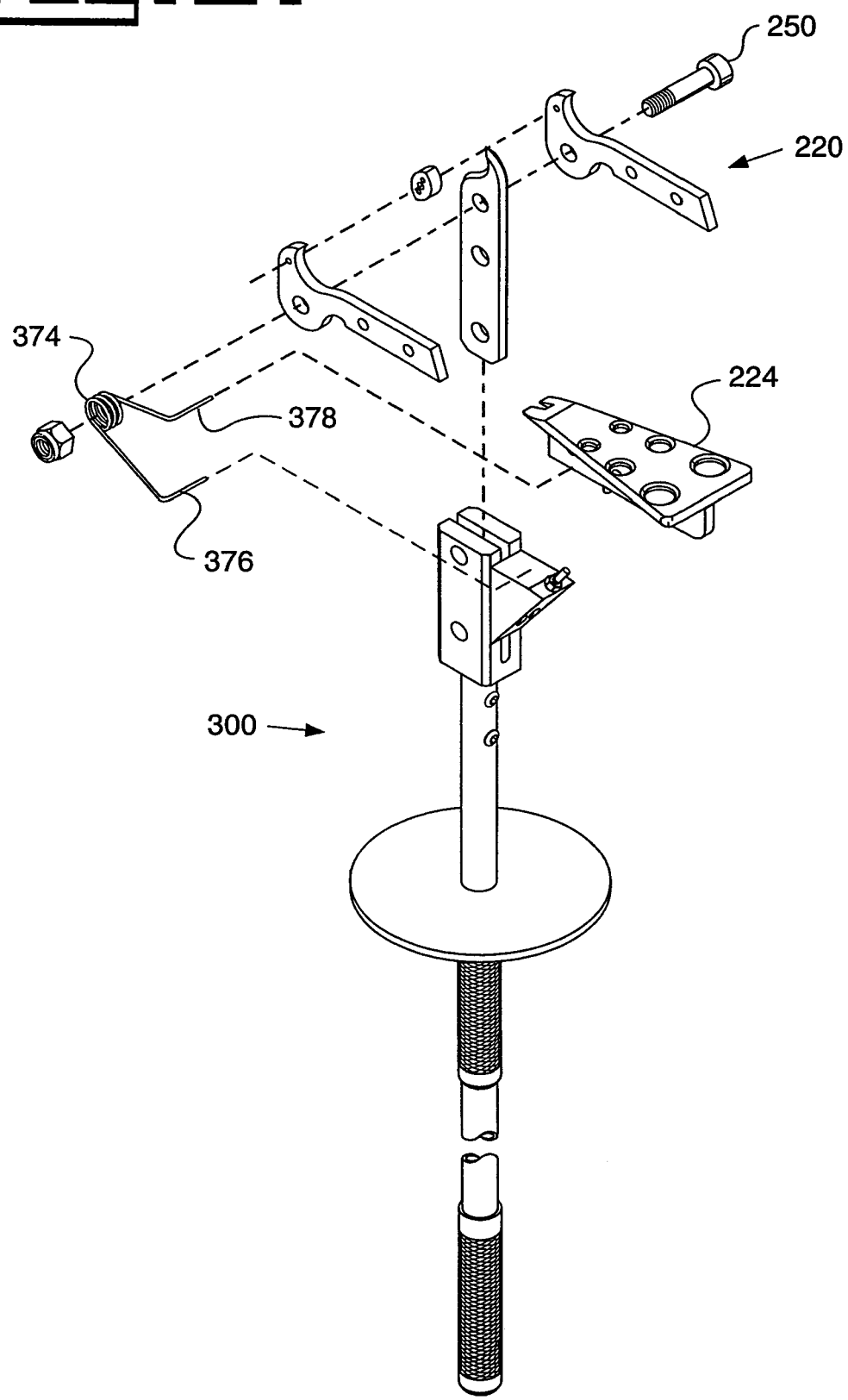

WIRE NIPPER

CROSS-REFERENCE TO RELATED APPLICATIONS

This application is a continuation-in-part of application Ser. No. 10/351,840 filed Jan. 27, 2003.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to cable and wire cutters and, more particularly, to a compression-type cable and wire cutter that can be controlled at a distance from a workpiece.

2. Related Art

Fibrous materials, such as cotton and nylon, are commonly formed into bales by simultaneous compression and binding. The bales are bound by wire, metal bands, plastic bands or other types of straps. After binding, the straps are under extreme tension such that merely cutting the strap will cause it to violently flail about. There is a continuing need in the wire cutting art for a device that allows a worker to cut the strap or wire at some distance from the cutting area.

U.S. Pat. No. 1,791,608 ('608) to Wippel illustrates a wire cutter having a bar, a plate pivoted to the bar, shearing means on the plate for severing a wire when rocked on its pivot, and a reversible handle member attached to the plate. However, operating the wire cutter disclosed by the '608 patent requires the operator to be close to the cutting area. Also, the '608 patent does not disclose a stop that prevents the handle from rotating too far.

U.S. Pat. No. 1,622,446 ('446) to Jourdan illustrates a wire cutter having two pivotally connected jaws, each jaw connected to a lever, an elongated bar connected to one of the levers, and a chain connected to the elongated bar. However, the wire cutter disclosed by the '446 patent is complex and difficult to operate.

There remains a need for a wire cutter having few components and simple operation that allows a worker to operate the wire cutter at a distance from the cutting area.

SUMMARY OF THE INVENTION

It is in view of the above problems that the present invention was developed. The invention is a wire cutter having a handle, a fixed cutting blade mounted on the handle, a lever pivotally connected to the handle, and a stop mounted on the lever for engagement with the fixed cutting blade. A spring mount block is mounted on the handle and a spring is intermediate the spring mount block and the lever. The spring biases the lever to an "open" position. The wire cutter of the present invention may be operated at a distance from the cutting area.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 2 is an exploded view of the wire nipper in a second embodiment;

FIG. 3 is an exploded view of the wire nipper in a third embodiment; and

DETAILED DESCRIPTION OF THE PREFERRED EMBODIMENTS

Figure 1A:
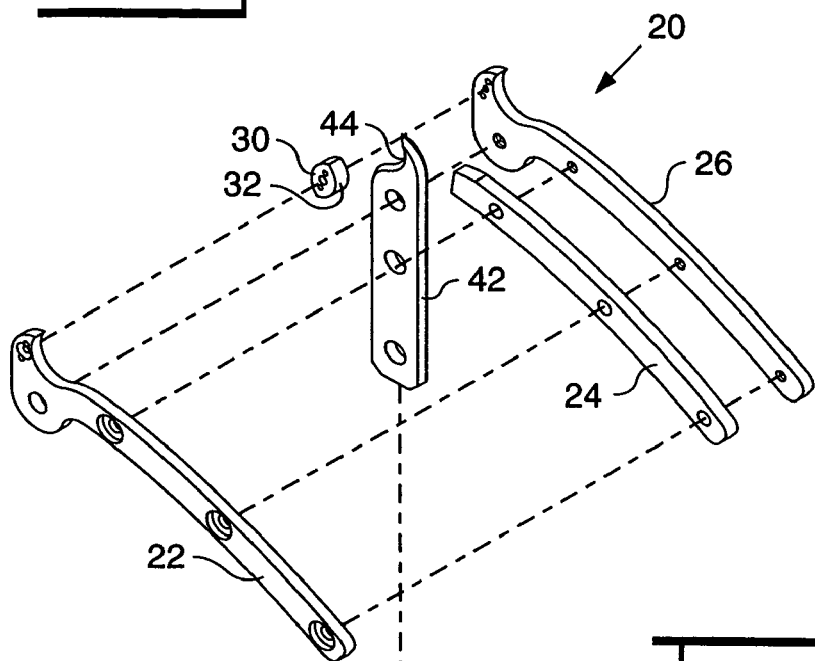
FIG. 1A is an exploded view of a wire nipper in a first embodiment.
Figure 1B:
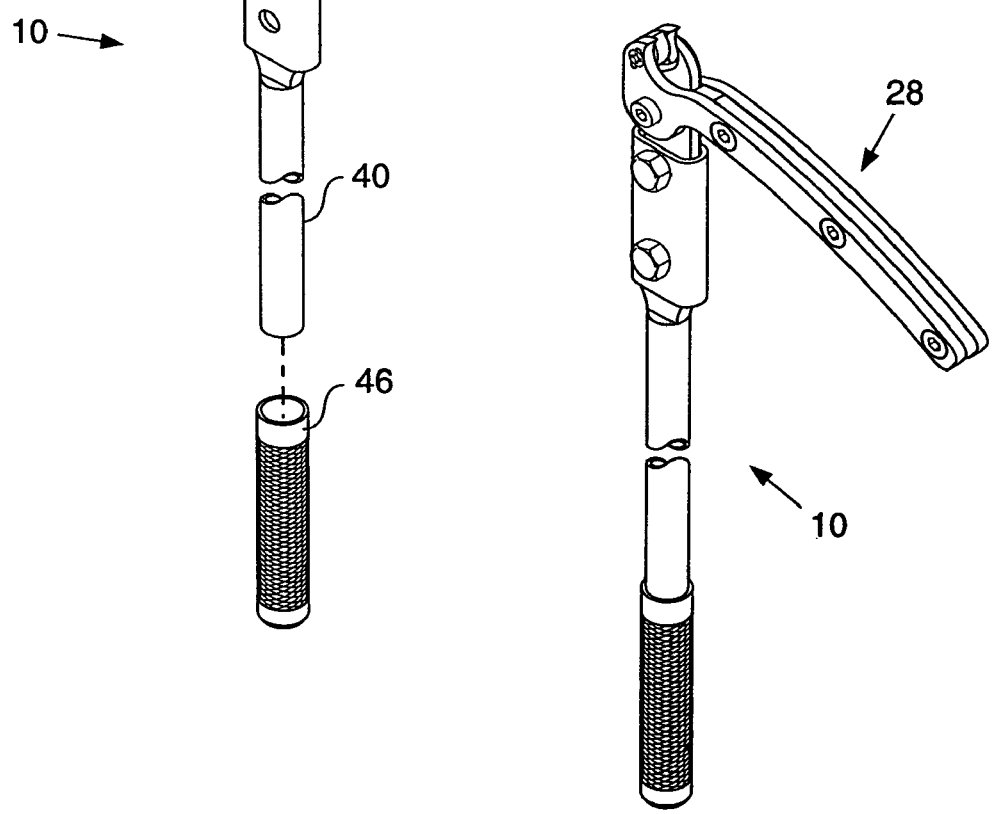
FIG. 1B is a perspective view of the wire nipper in the first embodiment.

Referring to the accompanying drawings in which like reference numbers indicate like elements, FIGS. 1A and 1B illustrate a wire nipper 10, alternatively termed a wire shear, a wire cutter, or wire scissors. The wire nipper 10 has a multiple-part lever 20. The lever 20 includes a first member 22, a spacer 24, and a second member 26. In some embodiments, the first member 22 and the second member 26 are dimensioned such that the spacer 24 is not required. As seen in FIGS. 1A and 1B, the lever 20 is L-shaped with a hooked end and an arcuate portion longitudinally extending from said hooked end.

A stop 30 is connected to the lever 20. In the embodiment depicted in FIG. 1A, the stop 30 is secured to the lever 20 through the use of spring pins and screws, however other means of attachment may be used. The stop 30 is located between first and second members 22, 26.

A handle 40 is pivotally connected at a proximate end to the lever 20. In the embodiment depicted in FIGS. 1A and 1B, the handle 40 and the lever 20 are pivotally connected through the use of a bolt having a shank, but other pivot connections are equally usable. Attached to the proximate end of handle 40 is a fixed blade 42 having a cutting edge 44. A grip 46 is attached to the handle 40. In some embodiments, the handle 40 is tubular such that a portion of the fixed blade 42 fits within the tubular handle 40. The cutting edge 44 is arcuate and a face 32 of the stop 30 is shaped such that it compliments the arcuate cutting edge 44.

FIG. 2 illustrates a second embodiment of the wire nipper, generally indicated by numeral 200. The wire nipper 200 has a first lever 220. The first lever 220 includes a first member 222, a T-shaped spacer 224, and a second member 226. As can be seen in FIG. 2, the T-shaped spacer 224 includes a trapezoidal head 223 with a narrow opening 225, such as a slot, notch, groove, or other void. In some embodiments, the first member 222 and the second member 226 are dimensioned such that the T-shaped spacer 224 is not required. As seen in FIG. 2, the first lever 220 has a hooked end 228. A stop 230 is connected to the first lever 220. The stop 230 is located between first and second members 222, 226.

A second lever 240 is pivotally connected at a proximate end 240A to the first lever 220. A handle 240C extends between the proximate end 240A and a distal end 240B. In the embodiment depicted in FIG. 2, the second lever 240 and the first lever 220 are pivotally connected through the use of a bolt 250 and secured by a nut 252, but other pivot connections are equally usable. A blade 242 is fixedly attached to the proximate end of the second lever 240. The blade 242 includes a cutting edge 244. Grips 246 are attached to the second lever 240. A guard 260 is also connected to the second lever 240. In the depicted embodiment, the guard 260 is circular; however, other shapes may be used.

A spring mount block 270 is connected to the proximate end of the second lever 240. For example, the spring mount block 270 can be connected to the second lever 240 by welding or fastening. Alternatively, the spring mount block 270 can be an integral component of the second lever 240. The spring mount block 270 has a receptacle 272. In the depicted embodiment, the receptacle 272 is a circular cavity having a shallow depth. The receptacle 272 receives a spring 274. In the depicted embodiment, the spring 274 is a compression type spring. The spring 274 biases the first lever 220 to an "open" position away from the second lever 240. In other words, the spring 274 distally biases the first lever 220 away from the second lever 240. In some embodiments, a stop pin 276 is connected to the T-shaped spacer 224. The stop pin 276 limits the travel of the T-shaped spacer 224 when the second lever 240 is rotated relative to the first lever 220.

FIG. 3 illustrates a third embodiment of the wire nipper, generally indicated by numeral 300. The third embodiment is nearly identical to the second embodiment shown in FIG. 2 except for the fact that the spring 274 has been removed. The wire nipper 300 includes a spring 374. The spring 374 is a torsion type spring. The spring 374 includes a first end 376 and a second end 378. The spring 374 is operatively connected to the pivot joint between the first lever 220 and the second 240. In the depicted embodiment, the spring 374 is mounted on the bolt 250. The first end 376 contacts the spring mount block 270, and the second end 378 contacts the first lever 220. In the depicted embodiment, the spring 374 contacts the T-shaped spacer 224. In this manner, the spring 374 biases the first lever 220 to an "open" position away from the second lever 240. In other words, the spring 374 biases the first lever 220 towards a distal position relative to the second lever 240.

Figure 4:
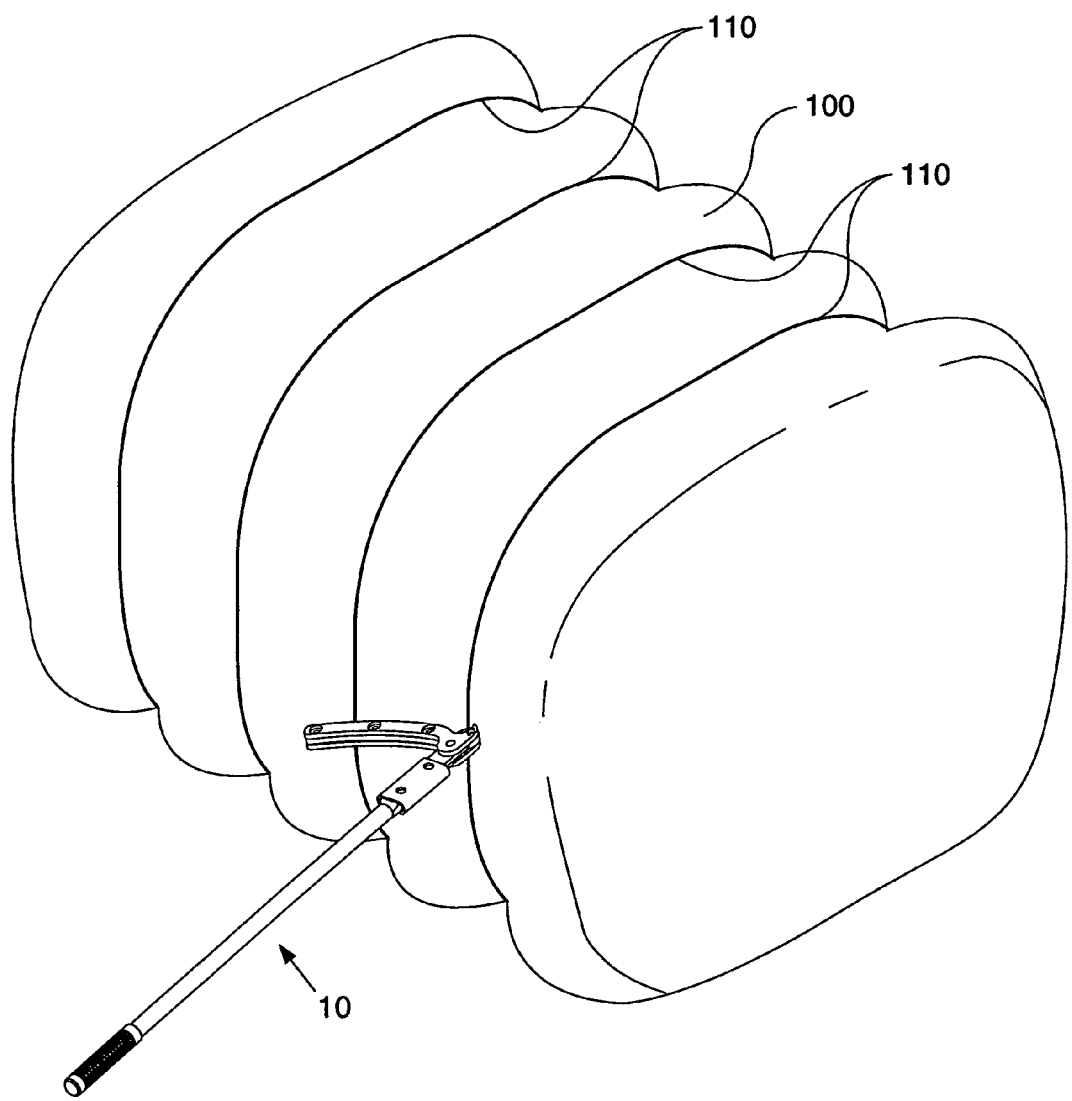
FIG. 4 is a perspective view of a cotton bale.

Referring now to FIG. 4, in operation, the wire nipper 200 is placed in proximity to a cotton bale 100 having wires 110. A face 28 (as best seen in FIG. 1B) of the first lever 220 is placed against the bale 100. The blade 242 is placed under one of the wires 110 with the cutting edge 244 directly in contact with the wire. Because the first lever 220 is biased into an "open" position, it is easier for a worker (not shown) to place the blade 242 under one of the wires 110. This is a significant improvement because previously the worker had to hold the first lever 220 relative to the second lever 240 in placing the wire nipper 200 in a cutting position. In other words, the worker had to hold the first lever 220 in an "open" position while placing the wire nipper 200 relative to the bale 100.

The worker grasps the second lever 240. The second lever 240 is preferably elongated such that the worker is at a significant distance away from said cutting edge 244. A significant distance is a length such that if the wire 110 were to suddenly snap and flail about that the worker would not be injured. For example, the length is in the range of 60 to 150 centimeters. In the depicted embodiments, the length is about 90 centimeters. The worker then pushes on the second lever 240, thereby rotating the second lever 240 relative to the first lever 220 and overcoming the spring force provide by the spring 274. Upon rotation of the second lever 240, the first lever 220 exerts force against the bale 100. In the depicted embodiment, the first lever 220 has an arcuate shape such that it rocks against the bale 100. The worker pushes on the second lever 240 until the stop 230 contacts the wire opposite the cutting edge 244. The combination of the cutting edge 244 and the stop 230 cause the wire to be crushed and cut.

Because the baling wire 110 is under extreme tension, it will most likely break from the crushing action of the cutting edge 244 and the stop 230. The worker continues to increase force on the second lever 240 until the wire 110 either breaks or is cut. When the wire 110 breaks or is cut, the cutting edge 244 engages the stop 230. To prevent premature wear of the cutting edge 244, the stop 230 is preferably a material hardness less than that of the cutting edge 244. The stop 230 also limits the rotation of the second lever 240.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the spring 274, 374 may be of the compression or torsion type. Thus, the breadth and scope of the present invention should not be limited by any of the above-described exemplary embodiments, but should be defined only in accordance with the following claims appended hereto and their equivalents.

What is claimed is:

1. A wire nipper comprising:
    a lever having a hooked end, said lever including a first member and a second member spaced apart from said first member;
    a removable arcuate stop operatively connected to said hooked end of said lever and located between said first member and said second member;
    a handle having a proximate end and a distal end, said proximate end pivotally connected to said lever;
    a fixed blade having a cutting edge operatively connected to said proximate end of said handle, whereby rotation of said handle engages said cutting edge with said removable arcuate stop and said handle is elongated such that said distal end of said handle is at a significant distance from said cutting edge;
    a spring mount block operatively connected to the handle; and
    a spring in operative communication with said spring mount block and said lever, said spring adapted to bias said lever to an open position.

2. The apparatus of claim 1, further comprising a stop pin operatively mounted on said spring mount block.

3. The apparatus of claim 1, further comprising at least one of the following operatively connected to said handle: a guard and a grip.

4. The apparatus of claim 1, wherein a material hardness of said stop is less than a material hardness of said fixed blade.

5. The apparatus of claim 1, wherein said significant distance is selected from the group consisting of 60, 90, and 120 centimeters.

6. The apparatus of claim 1, wherein said spring is a torsion type spring.

7. The apparatus of claim 1, wherein said spring is a compression type spring.

8. The apparatus of claim 7, wherein said spring mount block includes a receptacle for receiving said compression type spring.

9. The apparatus of claim 1, wherein said handle is tubular.

10. The apparatus of claim 9, wherein a portion of said fixed blade is located within said tubular handle.

11. The apparatus of claim 1, wherein said cutting edge is arcuate.

12. The apparatus of claim 1, wherein said lever is L-shaped and has an arcuate portion longitudinally extending from said hooked end.

13. A wire nipper comprising:
- a lever having a hooked end and including a first member, a T-shaped spacer, and a second member, said T-shaped spacer being located between said first and second members;
- a stop operatively connected to said hooked end of said lever and located between said first and second members;
- an elongated tubular handle having a proximate and a distal end, said proximate end pivotally connected to said hooked end of said lever;
- a fixed blade having a cutting edge operatively connected to said proximate end of said handle, whereby rotation of said handle engages said cutting edge with said stop;
- a spring mount block operatively connected to the handle; and
- a compression spring in operative communication with said spring mount block and said lever, said compression spring adapted to bias said lever away from said tubular handle.

14. The apparatus of claim 13, further comprising a stop pin operatively mounted on said spring mount block.

15. The apparatus of claim 13, wherein a material hardness of said stop is less than a material hardness of said fixed blade.

16. The apparatus of claim 13, wherein said spring mount block includes a receptacle for receiving said compression type spring.

17. The apparatus of claim 13, wherein said cutting edge is arcuate.

18. The apparatus of claim 17, wherein said stop has a face which is opposite and complimentary to said arcuate cutting edge.

19. A wire nipper for use with a bale of fibrous material bound by at least one strap, the wire nipper comprising:
- a lever having a hooked end and including a first member, a T-shaped spacer having a narrow opening, and a second member, said second member being spaced apart from said first member, and said T-shaped spacer being located between said first and second members;
- a stop operatively connected to said hooked end of said lever and located between said first and second members;
- an elongated handle having a proximate and a distal end, said proximate end pivotally connected to said hooked end of said lever;
- a spring mount block operatively connected to said elongated handle;
- a spring in operative communication with said spring mount block and said lever, said spring adapted to bias said lever away from said elongated handle; and
- a fixed blade operatively connected to said proximate end of said elongated handle, said fixed blade having a cutting edge, wherein said T-shaped spacer of said lever is placed against the bale such that said cutting edge engages the at least one strap, whereby rotation of said handle engages said cutting edge with said stop to cut or break the at least one strap.

20. The apparatus of claim 19, wherein said T-shaped spacer includes a trapezoidal head.

21. The apparatus of claim 19, further comprising a stop pin operatively mounted on said spring mount block.

22. The apparatus of claim 19, wherein said spring is a compression type spring.

23. The apparatus of claim 19, wherein said spring mount block includes a receptacle for receiving said compression type spring.

* * * * *